US012673401B2

(12) United States Patent
Massot et al.

(10) Patent No.: US 12,673,401 B2
(45) Date of Patent: Jul. 7, 2026

(54) DEVICE FOR SUPPORTING AND HOLDING THE GATE OF A WEDGE VALVE DURING A MAINTENANCE OPERATION

(71) Applicant: Electricite de France, Paris (FR)

(72) Inventors: Eric Massot, Chassieu (FR); Antonio Dinis De Araujo, Four (FR)

(73) Assignee: Electricite de France, Paris (FR)

( * ) Notice: Subject to any disclaimer, the term of this patent is extended or adjusted under 35 U.S.C. 154(b) by 0 days.

(21) Appl. No.: 19/107,718

(22) PCT Filed: Aug. 29, 2023

(86) PCT No.: PCT/EP2023/073676

§ 371 (c)(1),
(2) Date: Feb. 28, 2025

(87) PCT Pub. No.: WO2024/047043

PCT Pub. Date: Mar. 7, 2024

(65) Prior Publication Data

US 2026/0084275 A1 Mar. 26, 2026

(30) Foreign Application Priority Data

Sep. 1, 2022 (FR) ....................................... 2208791

(51) Int. Cl.
*B25B 27/24* (2006.01)

(52) U.S. Cl.
CPC .................................... *B25B 27/24* (2013.01)

(58) Field of Classification Search
CPC ...................................................... B25B 27/24
See application file for complete search history.

(56) References Cited

U.S. PATENT DOCUMENTS 2,373,020 A * 4/1945 Doster .................... F16K 41/02
137/315.28
4,630,347 A 12/1986 Chilton
(Continued)

FOREIGN PATENT DOCUMENTS

CN 114227615 A 3/2022

OTHER PUBLICATIONS

International Search Report for Application No. PCT/EP2023/073676 mailed Nov. 24, 2023. 3 pages.

*Primary Examiner* — Patrick C Williams
(74) *Attorney, Agent, or Firm* — Lerner David LLP

(57) ABSTRACT

The invention relates to a device (D) for supporting and holding the gate of a valve during a maintenance operation. It comprises two identical tools (8), each comprising a plate (80) in the form of a half-disc delimited by a generally rectilinear edge (800) and a semi-circular edge (801), the upper surface (802) of which plate (80) has a first radius, while the lower surface thereof, parallel to the upper surface (802), has a second radius which is smaller than the first radius, thereby forming a semi-circular peripheral shoulder (804), a through-cut (81) being made in the thickness of the plate (80), which through-cut, seen from above, is inscribed in a rectangle and opens onto the generally rectilinear edge (800), the side wall (810) of this cut (81) which extends parallel to the generally rectilinear edge (800) being inclined and forming an acute angle with a line perpendicular to the upper surface (802).

7 Claims, 15 Drawing Sheets

(56) References Cited

U.S. PATENT DOCUMENTS

| | | | | |
|---|---|---|---|---|
| 6,026,550 | A * | 2/2000 | Silano | B25B 27/24 29/266 |
| 10,563,467 | B2 * | 2/2020 | Nelsen | E21B 19/12 |
| 2005/0086788 | A1 | 4/2005 | Wasileski et al. | |
| 2013/0319542 | A1 * | 12/2013 | Ries | F16L 55/105 137/15.23 |

* cited by examiner

[Fig. 1]
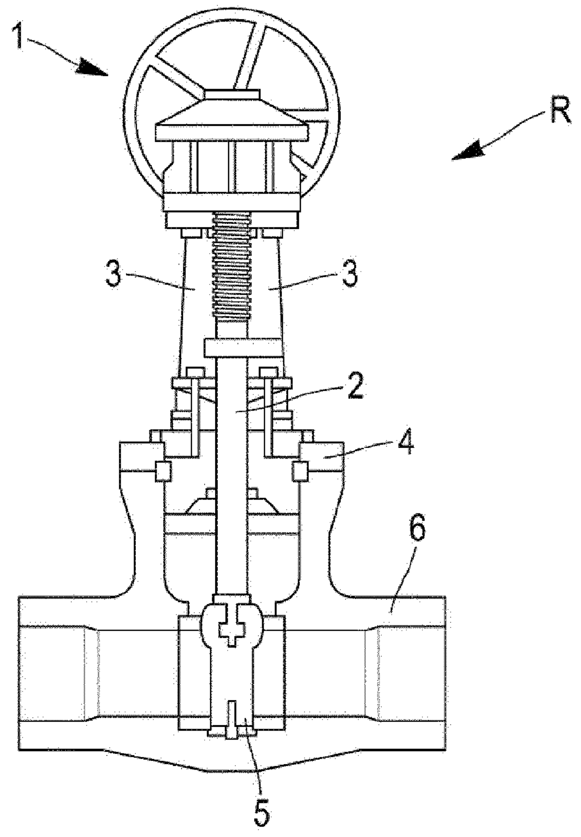
[Fig. 2]
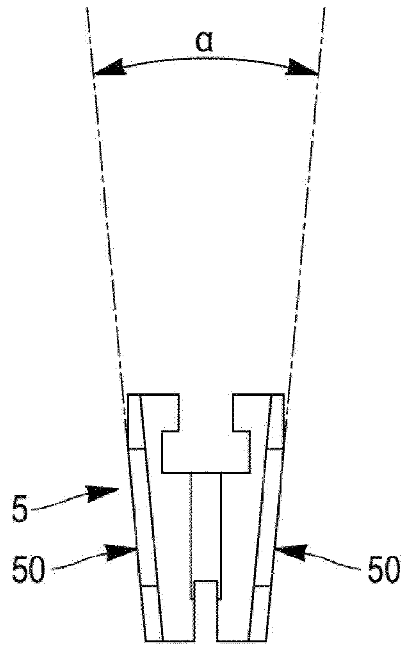

[Fig. 3]
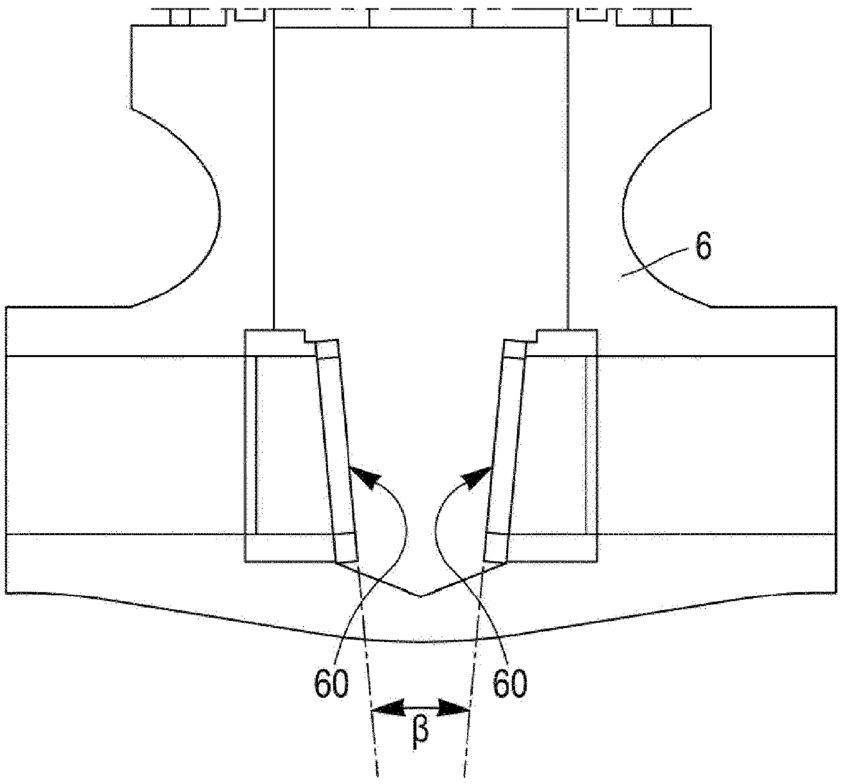
[Fig. 4]
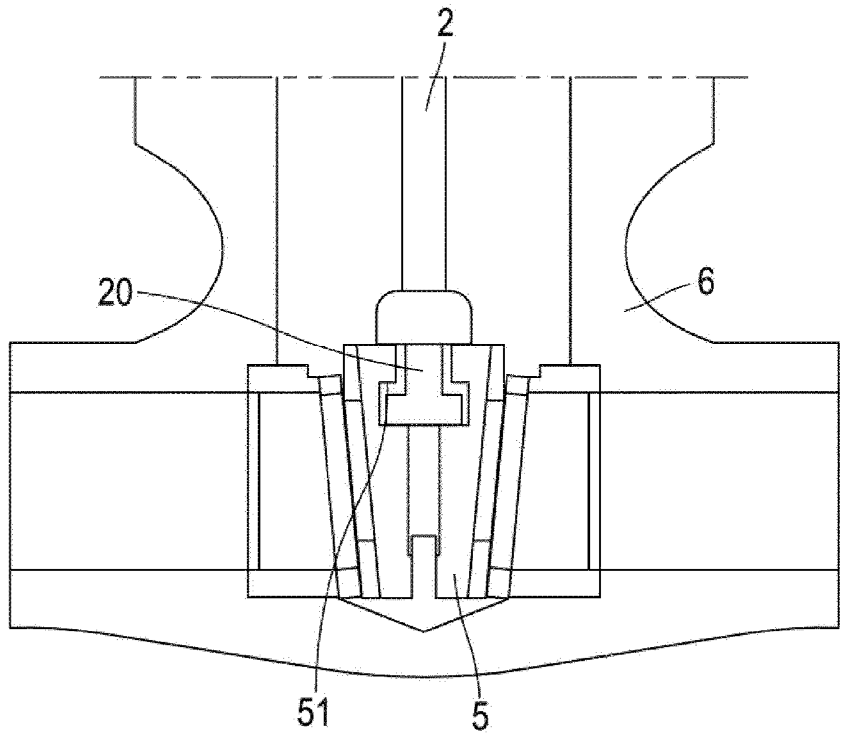

[Fig. 5]
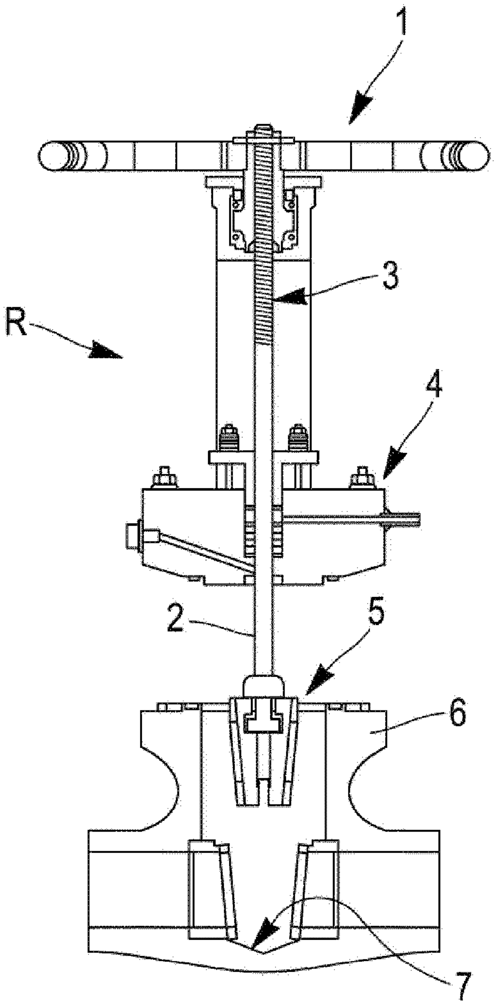

[Fig. 6]
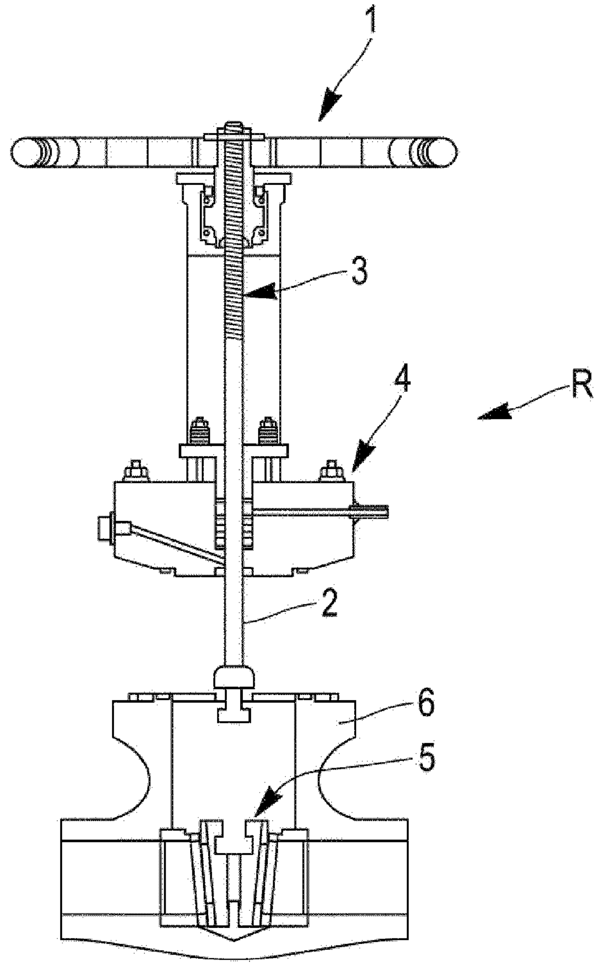
[Fig. 7]
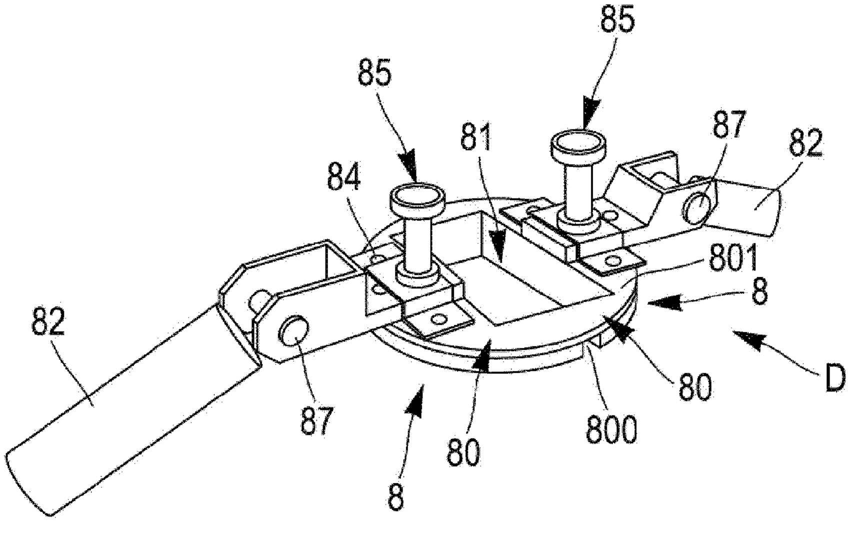

[Fig. 8]
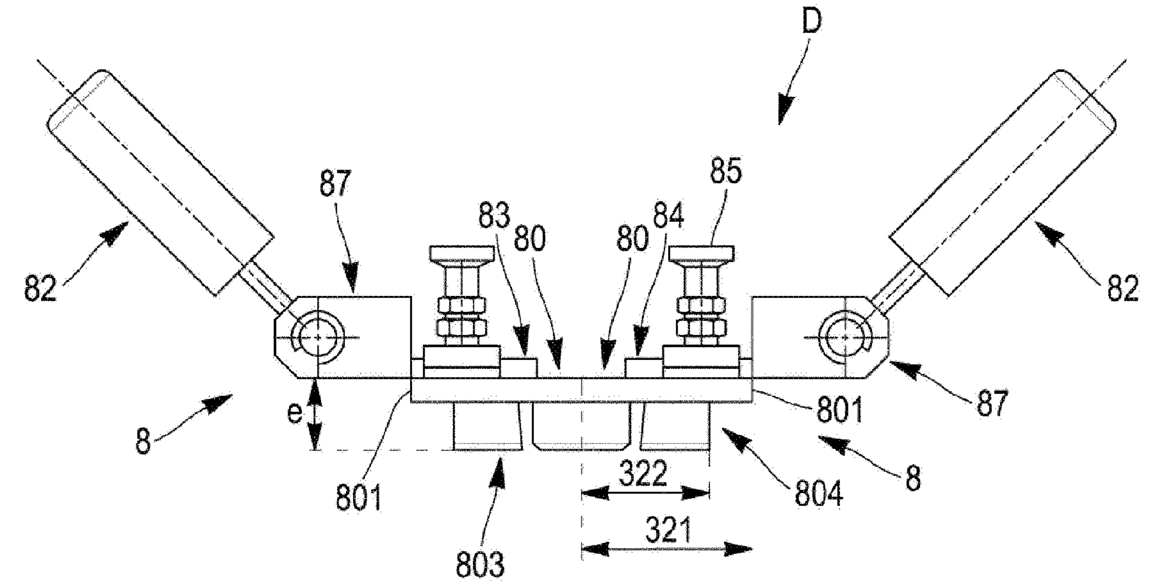
[Fig. 9]
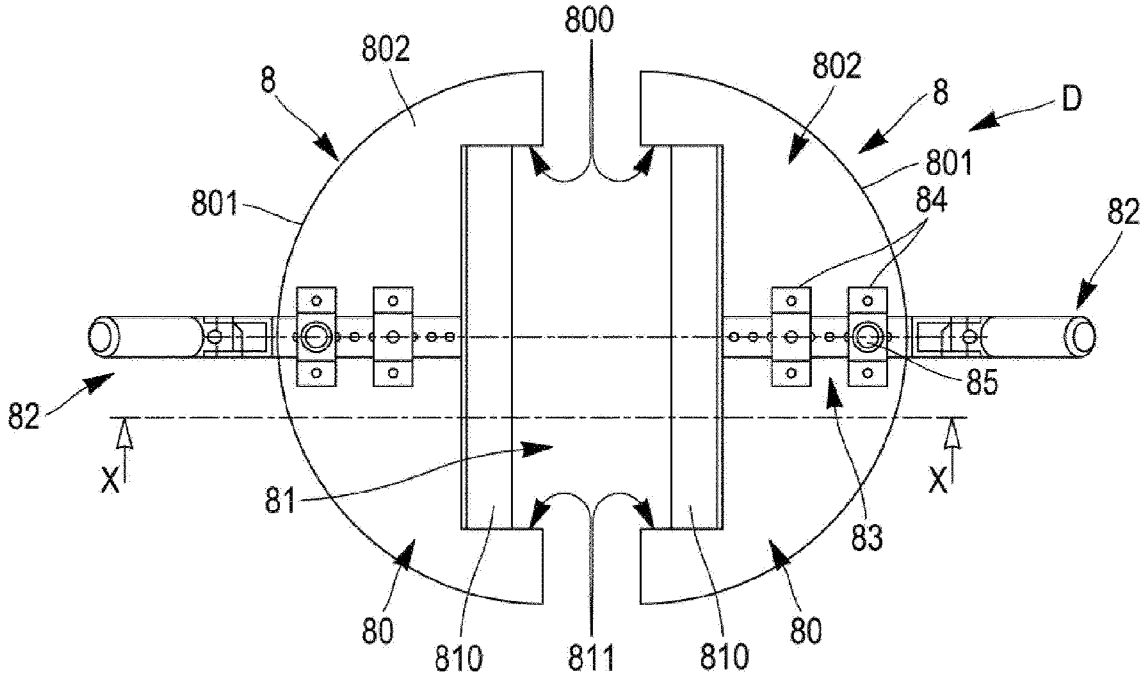

[Fig. 10]
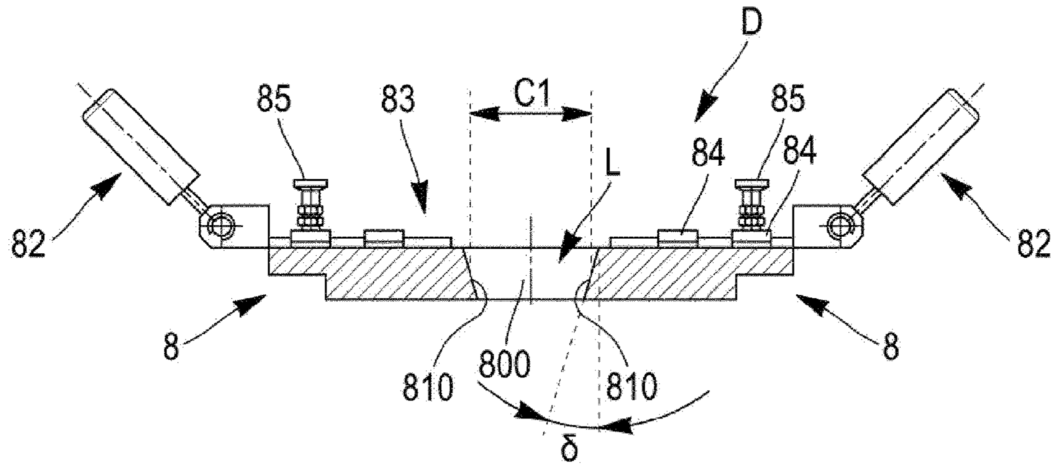
[Fig. 11]
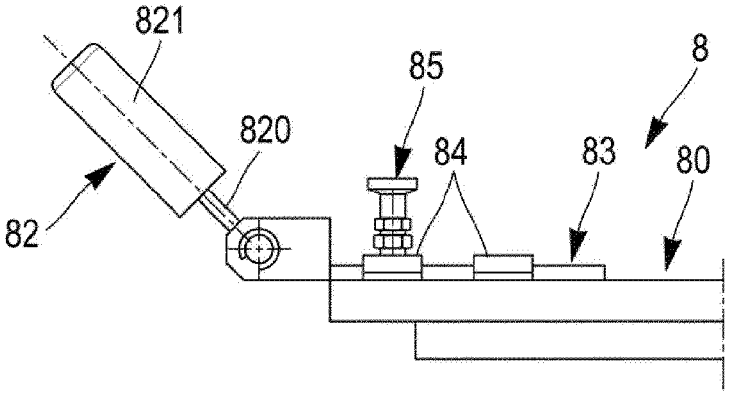
[Fig. 12]
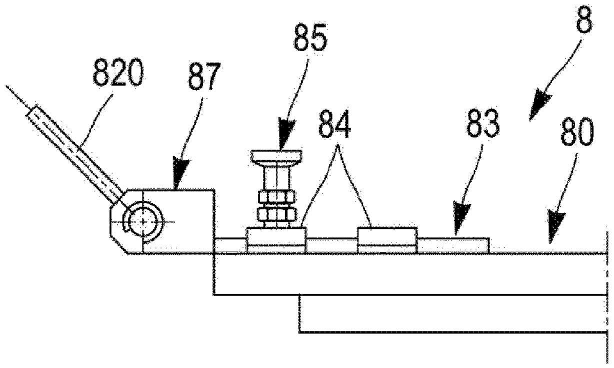

[Fig. 13]
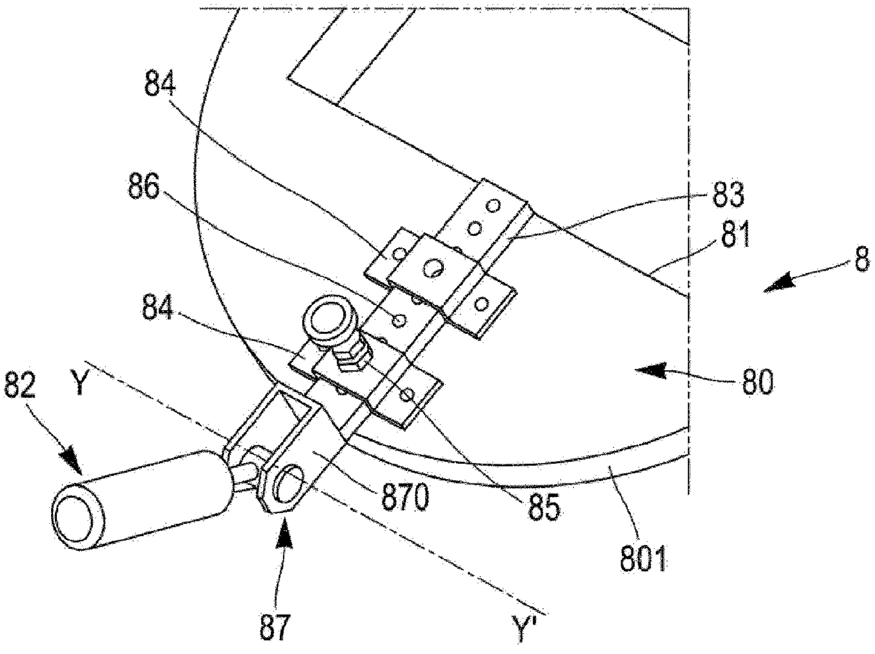
[Fig. 14]
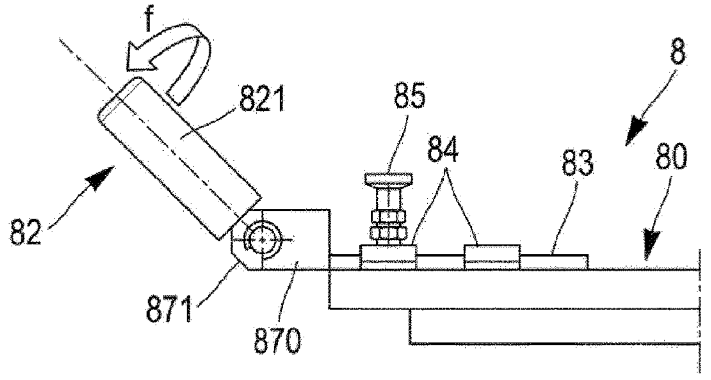
[Fig. 15]
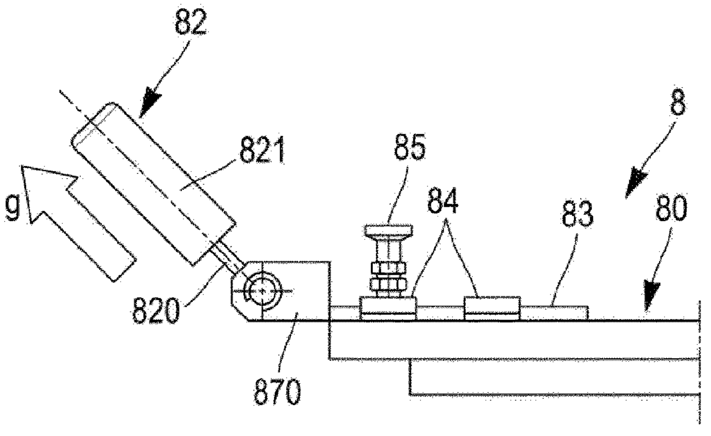

[Fig. 16]
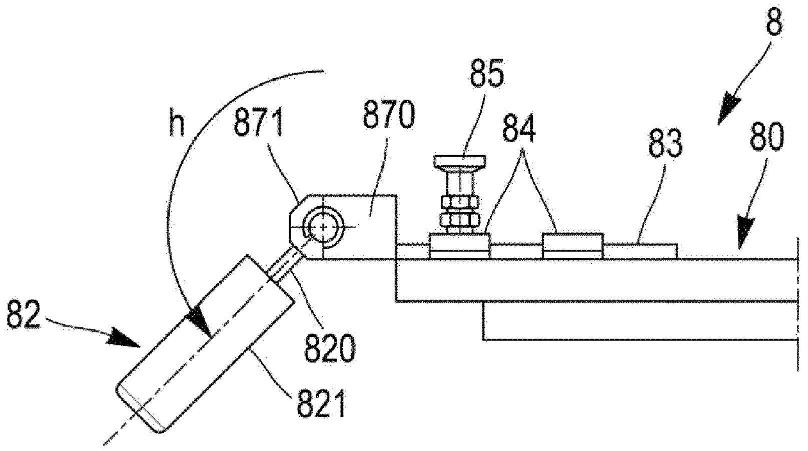
[Fig. 17]
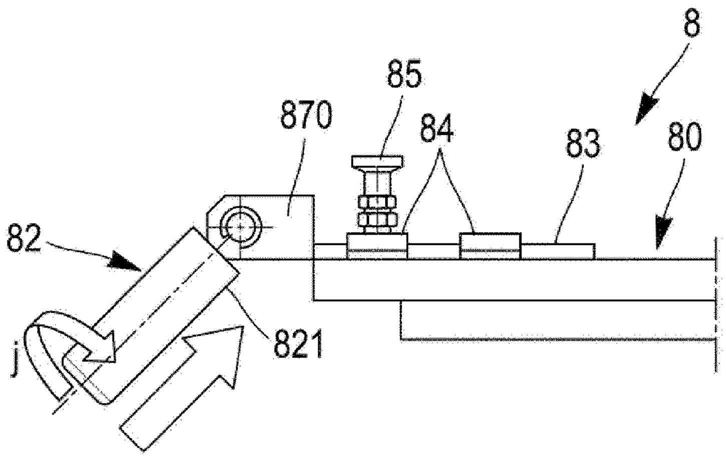
[Fig. 18]
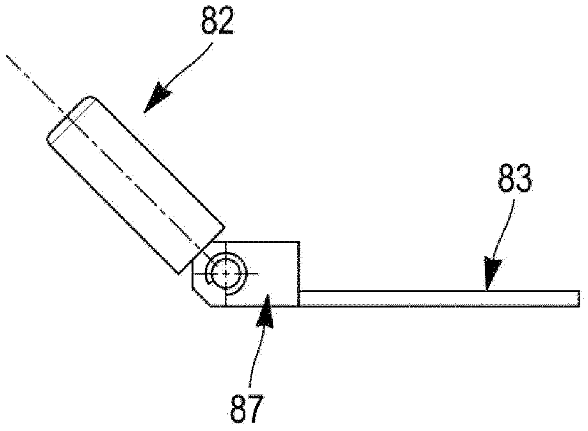

[Fig. 19]
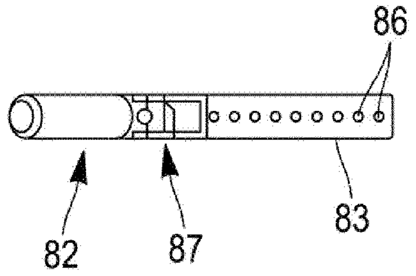
[Fig. 20]
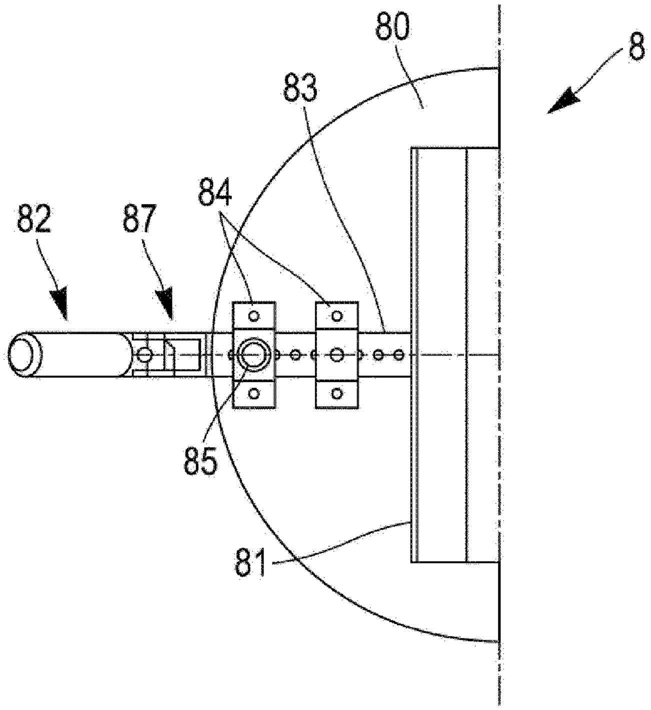
[Fig. 21]
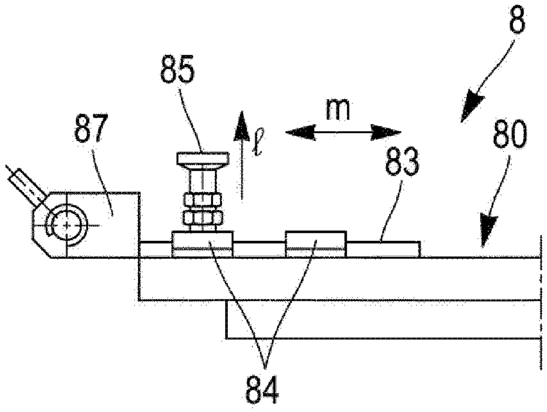

[Fig. 22]
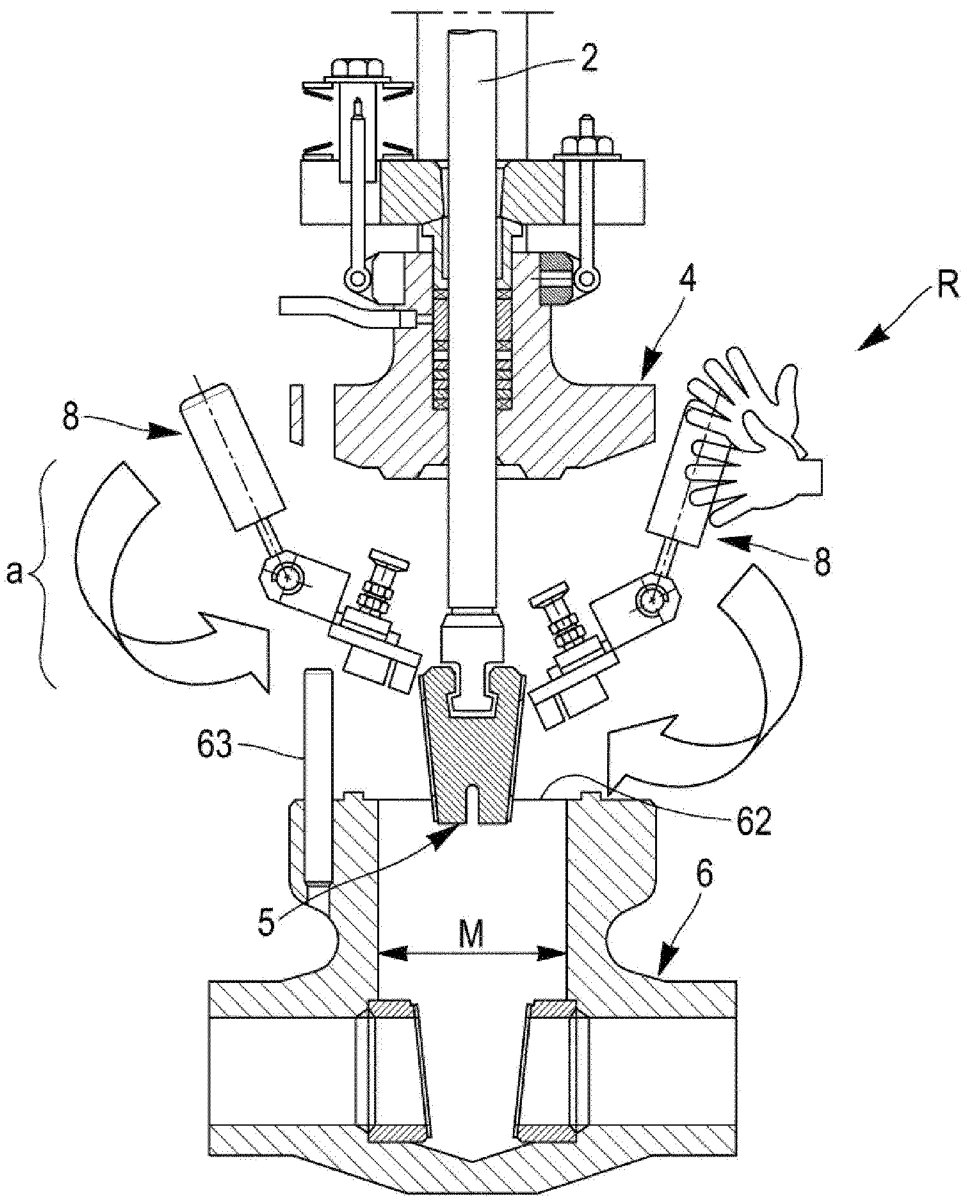

[Fig. 23]
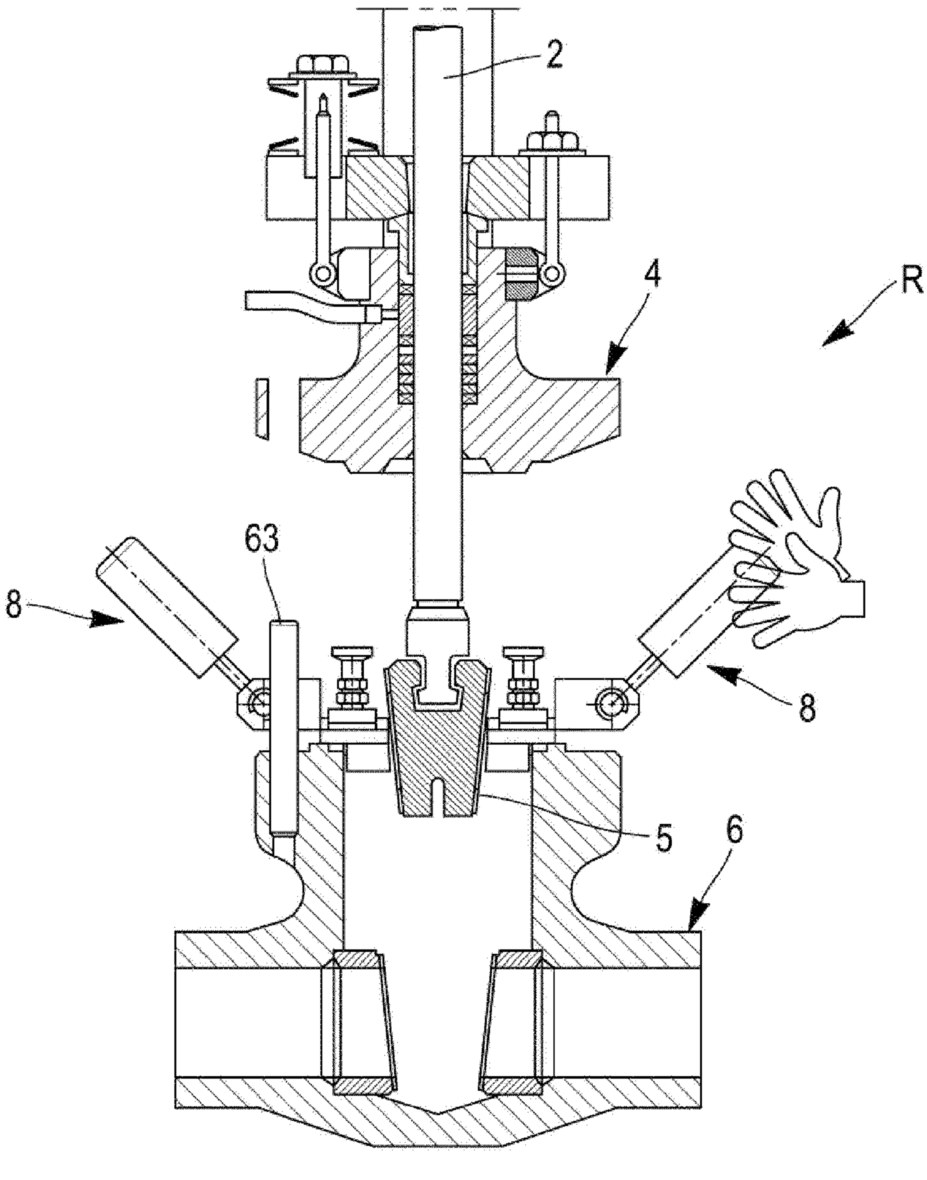

[Fig. 24]
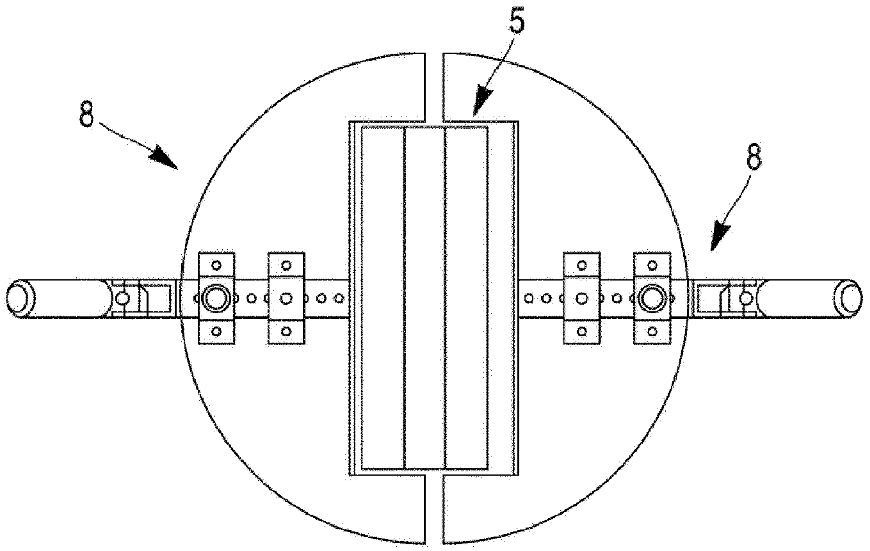
[Fig. 25]
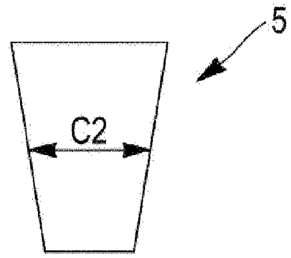
[Fig. 26]
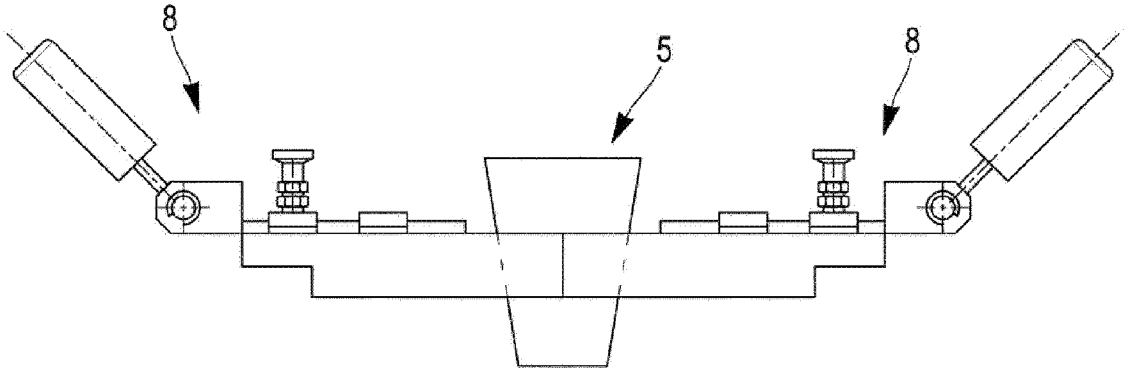

[Fig. 27]
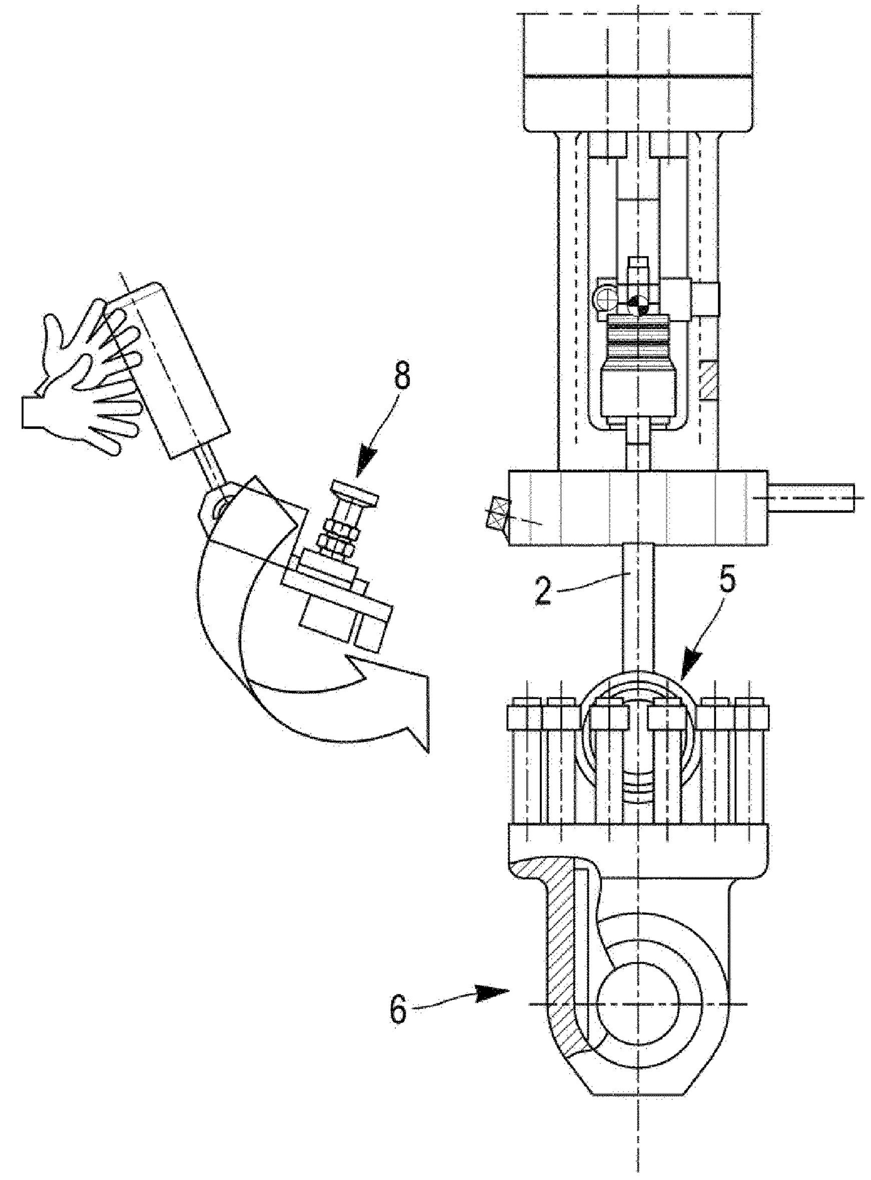

[Fig. 28]
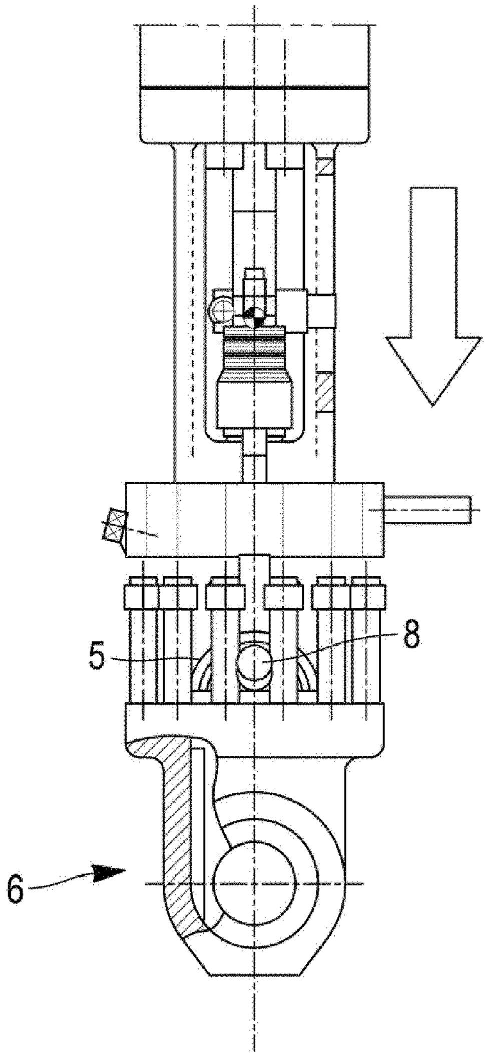

[Fig. 29]
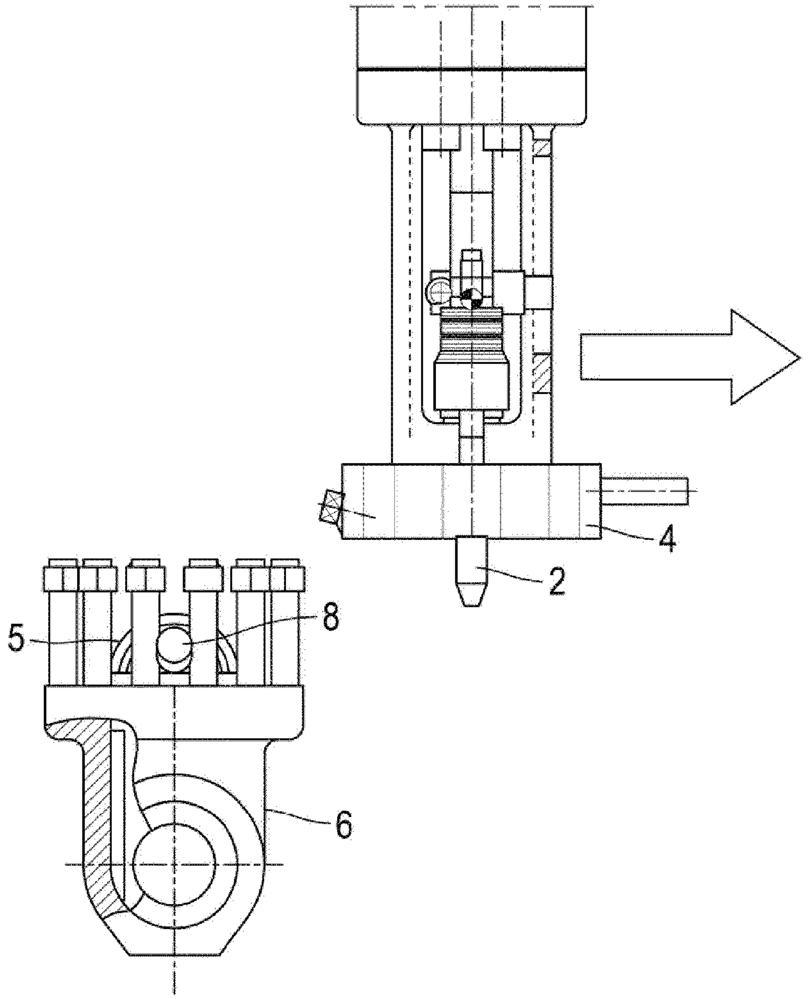

DEVICE FOR SUPPORTING AND HOLDING THE GATE OF A WEDGE VALVE DURING A MAINTENANCE OPERATION

CROSS-REFERENCE TO RELATED APPLICATIONS

The present application is a national phase entry under 35 U.S.C § 371 of International Application No. PCT/EP2023/073676 filed Aug. 29, 2023, which claims priority from French Patent Application No. FR2208791 filed Sep. 1, 2022, all of which are hereby incorporated herein by reference.

GENERAL TECHNICAL FIELD

The field of the present invention is that of the maintenance of valves in industrial facilities.

It more specifically relates to the maintenance on the internal components and/or the elements guaranteeing the sealing of the flow of a fluid circulating from upstream to downstream in isolation valves, in particular valves called "single-piece flexible wedge" valves.

CONTEXT OF THE INVENTION AND STATE OF THE ART

During a maintenance operation on the upstream and downstream sealing members of a valve R of the type mentioned above and schematically represented in FIG. 1, it is necessary to partially dismount the latter by removing its upper portion consisting of:

- an actuator 1 and its operating stem 2, which allow the operation of the valve R;
- a yoke 3, which is a part connecting the actuator 1 to the cap 4 of the valve R, the latter ensuring the outer sealing of the valve;
- a gate 5 which ensures the sealing from upstream to downstream of the body 6 of the valve R (when it is in the closed position of course).

On the majority of the globe valve, parallel-seat valve, ball valve, cage valve, butterfly valve, diaphragm valve technologies, the gate is held securely by a mechanical connection on the operating stem.

On the valves concerned by the present invention, the gate 5, which is represented in detail in FIG. 2, is also called "wedge" insofar as its two large opposite lateral faces 50 form an acute angle α. The expression "large opposite faces" means the two faces that bear on the seat 60 of the body 6 of the valve, seat itself defined by two inclined sides which form therebetween an angle β (see FIG. 3), substantially equal to α, in order to guarantee a perfect sealing of the valve in the closed position.

Such a gate is described as "flexible" because the two faces 50 provided with sealing surfaces accept a certain flexibility in order to be able to fit perfectly on the sealing surfaces of the seat in the valve body. The gate is made of stainless steel and the central portion between its aforementioned faces is machined in the shape of a cylinder, in order to give it the required flexibility.

Its two front and rear end faces fit into the shape of an isosceles trapezoid.

Moreover, in these valves, the gate 5 is connected to the stem 2 by a slide connection using a tenon 20-mortise 51 assembly which is a through assembly, as shown in FIG. 4.

If, as illustrated in FIG. 5, during the removal, that is to say the extraction of the aforementioned elements 1 to 5 from the body 6 of the valve R, the gate 5 were to slip from its tenon 20/mortise 51 connection and fall to the bottom 7 of the body 6 of the valve R, it could get mechanically stuck by its shape and the complementary shape of the seat 60, as illustrated in FIG. 6, making its extraction very difficult, with a significant risk of damage to the valve.

Consequently, the maintenance operations on these valves require the operators to hold the gate 5 with their hands so that it does not slip from its tenon/mortise connection with the stem 2, more specifically by positioning them under the cap 4 which is moved by a lifting means such as a hoist.

In addition to the fact that the gate 5 could get mechanically stuck in the bottom 7 of the valve R if it were to fall, an additional risk lies in the fact that the operators could have their hands crushed in the event of a breakage of the cap 4 lifting means.

Apart from the maintenance practice known and carried out to date, which is to hold the gate on the stem with the hands during its removal, no tooling exist to meet the need for securing the personnel during the maintenance operations.

Of course, a solution to avoid the practice of holding the gate with the hands would have been to modify the type of connection that connects it to the stem 2.

However, the design of the sealing currently implemented makes the mortise/tenon through connection preferable. Indeed, it allows the gate to slip into the connection when it is inserted into the valve seat and to be positioned in the best possible way in order to guarantee a perfect upstream/downstream sealing of the valve on the industrial facility.

Even if those skilled in the art were to modify the stem-gate connection to avoid the aforementioned risk, two major drawbacks would result therefrom, namely:

The operator of the industrial facility would have to, at best, modify the internal components of all the valves in its fleet, in order to adapt the stem-gate connection, and at worst, change the valves in the fleet, which would generate prohibitive costs.

The first solution mentioned above, when possible, also requires requalification to the operating conditions of the valve functions, some of which are critical for safety, in particular in a nuclear power plant.

A state of the art of interest in this area is illustrated by documents US2005/086788, U.S. Pat. No. 4,630,347 and CN114227615.

In any event, there remains an unmet need so far for a means that allows the operations described above to be carried out without risk to the operators, and that prevents the gate from falling inside the valve body.

The present invention aims to meet this need.

PRESENTATION OF THE INVENTION

Thus, the present invention relates to a device for supporting and holding the gate of a valve during a maintenance operation on said valve during which the actuator, the operating stem, the yoke, the cap and said gate of said valve have been previously separated from its body, so as to make the upper opening of diameter M of said body accessible, said gate, which has a cross section that fits into an isosceles trapezoid, being positioned at the free end of said operating stem, characterized in that it comprises two identical tools, each of them including a half-disk shaped plate delimited by a generally rectilinear edge and an arc-shaped edge, the plate having the upper face with a first radius r1, while its lower face, parallel to said upper face, has a second radius r2 smaller than said first radius r1, thus making an arc-shaped peripheral shoulder, a through cutout which, seen from above, fits into a rectangle and opens out onto said generally rectilinear edge being made in the thickness of said plate, the flank of this cutout which extends parallel to said generally rectilinear edge being inclined and forming an acute angle with a perpendicular to said upper face, said radii r1 and r2, as well as said acute angle being sized such that said two identical tools can be positioned in said upper opening of said body, by making their respective rectilinear edges contiguous, these tools resting on the rim of said upper opening by said shoulder while their lower face is engaged in said opening, said through cutouts together making a housing for receiving said gate, while said inclined flanks of said cutouts form means for retaining said gate.

Thanks to the characteristics of this device, it is possible to secure the usual maintenance operation, since it is no longer necessary for the operator to position his hands under the load.

Thus, the gate is held in position, without risk of falling inside the valve body.

In addition, the structure of this device is such that it does not require any modification of the existing valves.

Moreover, the intervention time is significantly reduced and the time saving obtained is all the more satisfactory when the valve is installed in an area with radioactive emission or contamination.

According to other advantageous and non-limiting characteristics of this device, taken alone or according to a technically compatible combination of at least two of them:

- the flanks of said cutout which extend perpendicularly to said generally rectilinear edge are perpendicular to said upper and lower faces;
- each tool includes a gripping and handling handle;
- said handle is connected to a fixing part secured to said upper face of said tool;
- the position of said fixing part is adjustable, in particular through its sliding;
- the position of said handle, relative to said fixing part, is adjustable in inclination and/or in depth.

DESCRIPTION OF THE FIGURES

Other characteristics and advantages of the invention will appear from the description which will now be given, with reference to the appended drawings, which represent, for information purposes but not as a limitation, at least one possible embodiment.

In these drawings:

FIG. 1 is, as previously indicated, a front diagram of a "single-piece flexible wedge" valve known from the prior art;

FIG. 2 is a front view of the gate that equips the valve of FIG. 1

FIG. 3 is a front and sectional view of the body of the valve of FIG. 1, intended to visualize the seat against which said gate is positioned;

FIG. 4 is a view similar to the previous one, in which the gate and its connecting stem are also represented;

FIG. 5 is a front and sectional view of a valve similar to that of FIG. 1, which illustrates the extraction of several of its components, prior to an operation aimed at checking the sealing of this valve;

FIG. 6 is a view similar to the previous one, which illustrates the situation in which the gate of the valve has unfortunately become detached from its connecting stem;

FIG. 7 is a perspective view of a device according to the invention, formed of two identical tools which are represented contiguous;

FIG. 8 is a view of the same device, seen from the side;

FIG. 9 is a top view of the device of FIG. 7, the tools being represented at a distance from each other;

FIG. 10 is a sectional view of the device of FIG. 9, seen along the cutting plane X-X, the tools being represented not contiguous;

FIG. 11 is a side view of one of the tools;

FIG. 12 is a view similar to the previous one, the sheath of the handle that equips it not being represented;

FIG. 13 is a partial perspective view of the tool of FIG. 11;

FIG. 14 is a first side view of the device of FIG. 11, intended to illustrate how the handle is positioned in different orientations;

FIG. 15 is a second side view of the device of FIG. 11, intended to illustrate how the handle is positioned in different orientations;

FIG. 16 is a third side view of the device of FIG. 11, intended to illustrate how the handle is positioned in different orientations;

FIG. 17 is a fourth side view of the device of FIG. 11, intended to illustrate how the handle is positioned in different orientations;

FIG. 18 is a side view of the handle of the tool of the previous figures and of the fixing part to which it is attached;

FIG. 19 is a view similar to the previous one, but seen from above;

FIG. 20 is a top view of a tool of the device according to the invention;

FIG. 21 is a side view of the device of the previous figure, intended to illustrate how the aforementioned fixing part is adjusted;

FIG. 22 is a first diagram intended to illustrate the manner in which a device according to the invention is set up on a valve;

FIG. 23 is another diagram intended to illustrate the manner in which a device according to the invention is set up on a valve;

FIG. 24 is a top view of the tools of the device according to the invention and of the gate of the valve supported and retained by said device;

FIG. 25 is a schematic view of the cross-section of the valve gate;

FIG. 26 is a view similar to FIG. 24, the gate and the device being seen from the side;

FIG. 27 is a third diagram intended to illustrate the manner in which a device according to the invention is set up on a valve, the body of the latter being represented equipped with studs that allow it to be fixed to the cap of the valve;

FIG. 28 is a third diagram intended to illustrate the manner in which a device according to the invention is set up on a valve, the body of the latter being represented equipped with studs that allow it to be fixed to the cap of the valve;

FIG. 29 is a view similar to the previous one, the actuator/operating stem/yoke/cap assembly being represented in the translated position.

DETAILED DESCRIPTION OF THE INVENTION

A non-limiting exemplary embodiment of the device D according to the invention will be described below, more particularly in FIGS. 7 to 21.

Then, with reference to FIG. 22 and following, the manner in which the device D can be used will be explained.

In accordance with a characteristic of the invention, the device D comprises two identical tools which are referenced 8 in the appended figures.

In these conditions, the description which will be given for one of the tools 8 also applies to the other of the tools, unless otherwise stated.

Each of them includes a thick plate 80, which has the shape of a half-disk, which is delimited by a generally rectilinear edge 800 and a curved edge 801, more specifically an arc-shaped edge.

Advantageously, this plate is made of non-ferrous composite material so as not to mark the parts of the valve, when it is positioned on the latter, as will be explained below.

The upper face 802 of the plate has a first radius r1. It will however be noted that its lower face 803, parallel to said upper face 802, has a second radius r2, smaller than said first radius r1, thus making an arc-shaped peripheral shoulder 804.

A through cutout 81 which, seen from above, fits into a rectangle and opens out onto the generally rectilinear edge 800 is made in the thickness e of the plate 80.

The flank 810 of this cutout 81 which extends parallel to said generally rectilinear edge 800 is inclined and forms an acute angle δ with a perpendicular to said upper face 802 (see particularly FIG. 10). As will be seen later, this angle is approximately equal to the angle α of the gate 5 of FIG. 2.

Advantageously, the other flanks 811 of the cutout 81, which extend perpendicular to the generally rectilinear edge 800 are perpendicular to the upper and lower faces 802 and 803.

With reference to FIG. 10 in which the two tools are positioned in a contiguous manner relative to each other by their rectilinear edges 800, the cutouts 81 make and delimit together a housing L for receiving the aforementioned gate 5. This aspect will be discussed later in the description.

Finally, it will be noted, with regard to this FIG. 10 that c1 has been referenced to the dimension measured at mid-height of the housing L. Again, this aspect will be discussed later in the description.

According to one particular embodiment of the invention, each tool 8 includes a gripping and handling handle 82, for example made of metal, in particular visible in FIGS. 7 to 11.

Advantageously, the handle 82 is connected to a fixing part 83 secured to said upper face 802 of the tool 8.

As is particularly visible in FIGS. 13 and 20, the fixing part 83 has the shape of an elongated strip which, in the position illustrated in the figure, extends exactly between the cutout 81 and the arc-shaped edge 801.

The fixing part 83 is held by a pair of clips 84 fixed to the upper face 802 of the tool 8. The number of clips may be different. Thus, in the embodiment of FIGS. 7 and 8, there is only one clip.

According to one embodiment, one of the clips is equipped with a non-dismountable indexing finger 85 mounted on a spring.

In the position illustrated here, the finger 85 is engaged in one of the through holes 86 formed in the thickness of the fixing part 83, so that the latter is held in a fixed position.

However, by acting on the finger 85 against the spring that equips it, it is possible to slide the fixing part 83, so as to be able to modify its spacing with respect to the edge 801. This is symbolized by the arrows l and m in FIG. 21.

In doing so, the position of the handle 82 can be modified.

As is particularly visible in FIG. 13, the fixing part 83 can include at its proximal end a clevis 87 with parallel wings 870 between which a small articulation axis (symbolized by the axis Y-Y') of the handle 82 is mounted.

The handle 82, in one possible embodiment, is capable of occupying different angular positions, relative to the fixing part 83.

To do so, the free ends of the wings 870 include cut sides 871.

In addition, and as visible in FIG. 11, the handle 82 is made up of a threaded stem 820 directly secured to the articulation axis mounted on the clevis 87, and of a tapped sheath 821 sized to engage on the stem 820 by screwing.

Thus, from an initial position (FIG. 14) in which the sheath 821 is screwed fully so that it comes into abutment against sides 871 of the wings 870 of the clevis 87 of the same orientation, it is possible to partially unscrew this sheath (arrow f in FIG. 14) so as to release it from the clevis 87 (arrow g in FIG. 15).

As soon as it is no longer in contact with the clevis 87, it is possible to give the handle 82 a different orientation, as symbolized by the arrow h in FIG. 16.

Then, by screwing the sleeve (arrows j and k in FIG. 17) until the sheath 821 comes into abutment against another pair of sides of the same orientation, the new orientation of the handle 82 is "fixed".

In total, it is possible to give the handle 82 two extreme positions in which it extends perpendicularly to the clevis 87, as well as three intermediate positions given by the sides 871. Of course, the number of sides is not fixed. Moreover, other means for immobilizing the handle in a given orientation can be envisaged.

This makes it possible to adjust the orientation of the handle 82 according to the configuration of use of the tools 8 and in particular the space available in the vicinity of the handle. And the possibility of sliding the fixing part 83 makes it possible to adapt even better to the use configurations that are presented to the users.

How the device D according to the invention can be used will be described below, particularly with reference to FIG. 22 and following.

Thus, with reference to FIG. 22, it is a situation close to that of FIG. 5, namely a situation where the elements 1 to 5 of the valve have been extracted. As soon as the gate 5 is partially or completely extracted from the body 6 of the valve R, there is a space a which is used to set up the device D according to the invention.

M is referenced in FIG. 22 to the diameter of the vertical upper opening 62 of the body 6 which receives in particular the gate 5 and the stem 2.

According to the invention, the aforementioned radii r1 and r2 are chosen such that when the two tools 8 are made contiguous by their rectilinear edges 800, it is possible to position them on the top of the body 6, as represented in FIG. 23.

In practice, the diameter M is slightly greater than twice the radius r2, while it is smaller than twice the radius r1. Thus, the tools 8 rest on the rim of the upper opening 62 of the body 6 by the shoulder 804, while their lower face 803 is engaged in said opening.

This allows mutual positioning and holding of the two tools 8 without any action other than their set-up on the body 6 of the valve R.

Moreover, the handles 82 with their adjustment possibilities allow releasing the hands of the operators from the lifted load and allow perfect positioning between the studs 63 which, in normal times, allow assembling the cap 4 on the body 6.

Moreover, the through cutouts 81 together form a housing for receiving the gate 5, while the inclined flanks 810 of these cutouts form the means for retaining the gate.

On each tool 8, the inclined flank 810 is machined with an angle δ corresponding to the angle α of the gate 5.

Preferably, the dimension C1 of FIG. 10, at mid-height of the inclined sides 810 corresponds to the median thickness of the gate 5, as defined by the dimension C2 of FIG. 25, making it possible to keep the gate centered in the valve body, and thus preventing it from falling when it is uncoupled from the stem 2 of the valve R.

Moreover, this ensures that the gate does not touch any wall of the valve and does not suffer, or cause damage to the valve.

The thickness e (FIG. 8) of the tools 8 is calculated so that these are capable of withstanding the weight of the gate 5 and not tilting in the body 6 of the valve.

As shown in FIGS. 27 to 29, once the device D according to the invention is set up (FIG. 28), the gate resting thereon, it is sufficient to translate the cap 4/yoke 3/stem 2 assembly to release the gate 5 from the stem 2 (FIG. 29) and thus leave the gate in place on the tooling.

It is then easy to pick up the gate without ever having to put the operator's hands under the suspended load.

The latitude of positioning of the tools 8 makes it possible to adapt to all conditions and space requirements of the work area.

A device size can correspond to each valve size.

This device can be used for any intervention on the valves requiring in particular the maintenance of the sealing surfaces of the internal parts and the opening of the valve body.

Among the advantages provided by the device according to the invention, there is in particular:

- securing the maintenance operation, no longer requiring the operator to put his hands under the load;
- reducing the intervention time. Indeed, according to the prior art, it was necessary to place studs for assembling the cap on the body of the valve, to allow translating the upper portion/stem/gate assembly outside the vertical axis of the valve. It is estimated that the overall time saving is comprised between 20 minutes and one hour. Moreover, the time required to set up the device is of the order of 5 minutes.
- due to the reduction in the intervention time, the radioactive dosimetry integrated by the operators is reduced accordingly, for any valve installed in an area with radioactive emission or contamination.

All industries with processes using pressurized fluids are potentially interested in the device according to the invention.

The invention claimed is:

1. A device for supporting and holding a gate of a valve during a maintenance operation of the valve during which an actuator, an operating stem, a yoke, a cap and the gate of the valve have been previously separated from the body of the valve, so as to make an upper opening of diameter M of the body accessible, the gate, which has a cross section that fits into an isosceles trapezoid, being positioned at a free end of the operating stem, wherein the device comprises two identical tools, each of the tools including a half-disk shaped plate delimited by a rectilinear edge and an arc-shaped edge, the half-disk shaped plate having an upper face with a first radius r1, while a lower face of the half-disk shaped plate, parallel to the upper face, has a second radius r2 smaller than the first radius r1, thus making an arc-shaped peripheral shoulder, a through cutout which, seen from above, fits into a rectangle and opens out onto the rectilinear edge being made in a thickness of the half-disk shaped plate, the flank of the through cutout which extends parallel to the rectilinear edge being inclined and forming an acute angle with a perpendicular to the upper face, the radius r1, the radius r2 and the acute angle being sized such that the tools are configured to be positioned in the upper opening of the body, making their respective rectilinear edges contiguous, the tools resting on a rim of the upper opening by the shoulder while their lower face is engaged in the opening, the through cutouts together making a housing for receiving the gate, while the flanks of the through cutouts are retaining the gate.

2. The device according to claim 1, wherein flanks of the through cutout, the flanks extending perpendicularly to the rectilinear edge, are perpendicular to the upper face and the lower face.

3. The device according to claim 1, wherein each tool includes a gripping and handling handle.

4. The device according to claim 3, wherein the handle is connected to a fixing part secured to the upper face of the tool.

5. The device according to claim 4, wherein the position of the fixing part is adjustable.

6. The device according to claim 4, wherein the position of the handle, relative to the fixing part, is adjustable in inclination, in depth, or both in inclination and in depth.

7. The device according to claim 5, wherein the position of the fixing part is adjustable through sliding of the fixing part relatively to the upper face of the tool.

* * * * *